INVENTOR.
Donald E. Sutton
BY
Attorney.

Patented Jan. 22, 1952

2,583,238

UNITED STATES PATENT OFFICE 2,583,238

SOUND SILENCING MEANS FOR CIRCULAR SAWS

Donald E. Sutton, Kalamazoo, Mich., assignor to Hammond Machinery Builders, Inc., Kalamazoo, Mich.

Application August 10, 1949, Serial No. 109,505

5 Claims. (Cl. 143—157)

This invention relates to improvements in sound silencing means for circular saws.

The main objects of this invention are:

First, to provide a sound deadening means for circular saws which silences the sound commonly incident to the rotation of a circular saw blade at high speed.

Second, to provide a sound silencing means which can be readily incorporated in machines having different structural features.

Third, to provide a sound silencing means which is simple and economical in structure and at the same time highly efficient.

Objects relating to details and economies of the invention will appear from the description to follow. The invention is pointed out in the claims.

A preferred embodiment of the invention is illustrated in the accompanying drawings, in which.

Figure 1:
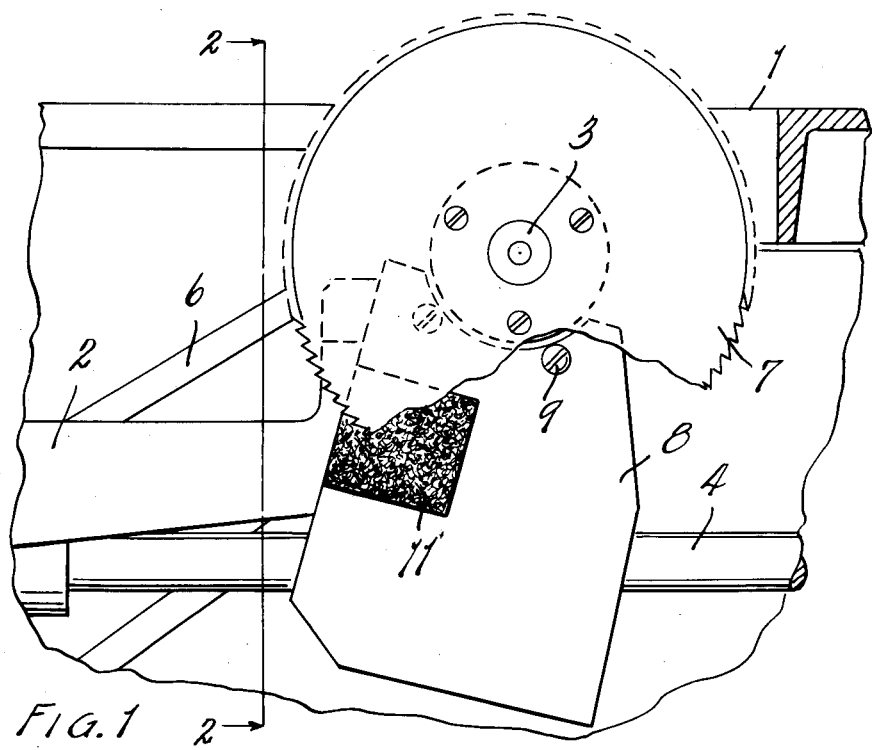
Fig. 1 is a fragmentary view partially in vertical section of a sawing machine embodying my invention.
Figure 2:
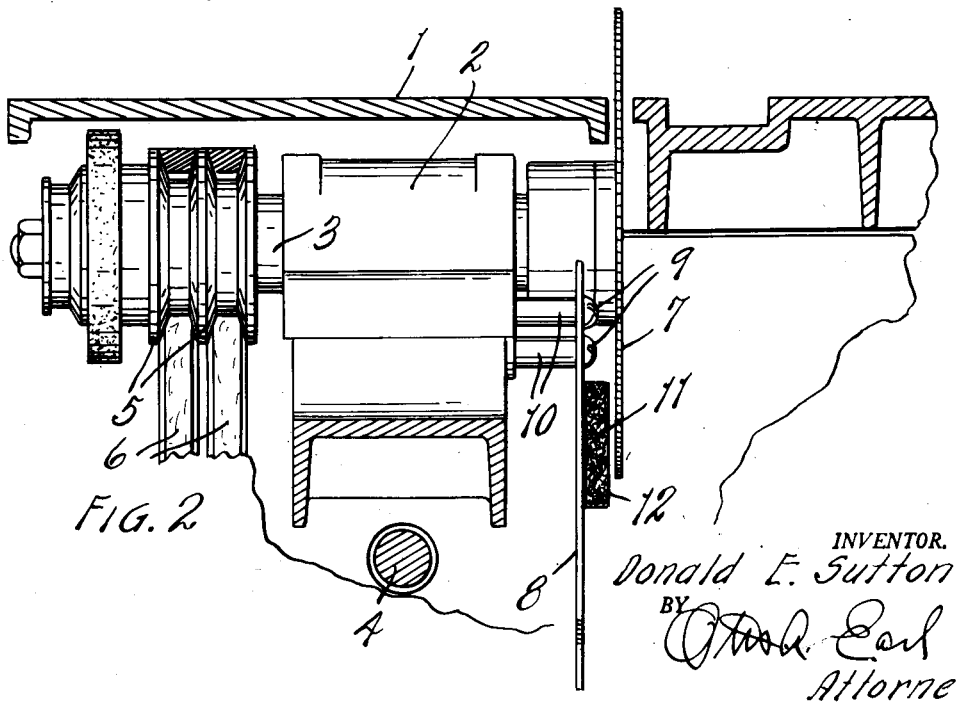
Fig. 2 is a fragmentary view partially in section on a line corresponding to line 2—2 of Fig. 1.

In the accompanying drawing only such portions of a sawing machine are illustrated as is deemed necessary to illustrate a practical embodiment of my invention, in which drawings 1 represents the table and a supporting structure generally and 2 the tiltable carrying frame for the saw arbor 3, the frame being raised or lowered by the rod 4. The arbor 3 is provided with pulleys 5 for the driving belts 6. The saw 7 is mounted on the arbor in operative relation to the table.

It is a matter of common observation and experience that saws of this character commonly produce a very penetrating noise which is not only disagreeable to the person operating the saw but is disagreeable and disturbing to others within a very considerable range. The sound silencing means of my invention comprises a plate-like support 8 which is mounted on the arbor support 2 by means of screws 9 and spacers 10 to support the plate in spaced parallel relation to the blade at one side thereof, the plate desirably being of substantial area so as to embrace a substantial segment of the saw and to project beyond the periphery of the saw. A flat piece of felt or like fibrous material 11 is adhesively secured to the side of the plate 8 adjacent the saw blade with its face 12 in parallel relation to the side of the saw and closely adjacent to but in non- contacting relation to the blade. This block or piece of fibrous material is of substantial area and desirably of uniform thickness. It is disposed in lapping relation to the saw blade, that is, it projects within the periphery thereof as well as beyond the periphery. This results in an effective silencing of the objectional noise of the blade both on new blades and on used blades. Sponge rubber may be used with quite satisfactory results, but I prefer the felted fibrous material.

It is a matter of observation that the harmonics of a blade usually change with use. The applicant's silencer, however, is efficient throughout such changes or variations and for different blades which usually produce characteristic noises.

I have illustrated and described my invention in a very simple and practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. The combination in a sawing machine including a table, an arbor, an arbor supporting bracket mounted for tilting adjustment relative to the table, and a circular saw blade mounted on said arbor, of a sound deadening means comprising a plate mounted on said arbor bracket parallel to and adjacent but spaced from the blade to depend below the blade, said plate being supported radially with respect to said saw at its inner end only, and a piece of porous material, such as felt, sponge rubber, etc., of substantial and uniform thickness mounted on said plate and positioned between it and the blade with its face in noncontacting relation to the blade and with a portion thereof in overlapping relation to the blade and a portion projecting outwardly beyond the periphery of the blade.

2. In a sawing machine including a saw arbor, a tiltable supporting bracket therefor, and a circular saw blade mounted on the arbor, a sound deadening means comprising a support mounted on said arbor bracket for tilting adjustment therewith, said support being supported in parallel relation to the plane of the blade, and a piece of fibrous material of substantial area and of uniform thickness mounted on the side of the support to be supported thereby throughout its area and with its face closely adjacent to but in spaced parallel relation to one side of the blade and with a portion thereof projecting beyond the periphery of the blade and a portion thereof within the periphery of the blade.

3. In a sawing machine including a saw arbor, and a circular saw blade mounted on the arbor, a sound deadening means comprising a support mounted in parallel relation to the plane of the blade, and a piece of porous material of substantial area and of uniform thickness mounted on the support to be supported with its face adjacent to but in spaced parallel relation to one side of the blade and with a portion thereof projecting beyond the periphery of the blade and a portion thereof within the periphery of the blade.

4. In a sawing machine including a saw arbor, and a circular saw blade mounted on the arbor, a sound deadening means comprising a support on said machine terminating in spaced parallel relation to the plane of the blade, and a piece of porous material of substantial area and of uniform thickness mounted on the side of the support adjacent the blade with its face adjacent to but in spaced parallel relation to one side of the blade, said piece extending radially inwardly and outwardly transversely of the peripheral line of the saw.

5. In a sawing machine including an arbor, a saw blade mounted on said arbor, and a sound deadening means comprising a support mounted on said machine and terminating adjacent the saw and in relatively fixed relation thereto, and a piece of porous material mounted on said support with its outer side closely adjacent to but in noncontacting relation to one side of the blade, said piece extending radially at least across the depth of the teeth of the saw and a substantial segment thereof.

DONALD E. SUTTON.

REFERENCES CITED

The following references are of record in the file of this patent:

UNITED STATES PATENTS

| Number | Name | Date |
|---|---|---|
| 1,511,788 | Vaughan | Oct. 14, 1924 |
| 1,726,524 | Bobrowsky | Sept. 3, 1929 |
| 1,873,700 | Dempster | Aug. 23, 1932 |
| 2,014,222 | Bieling et al. | Sept. 10, 1935 |

FOREIGN PATENTS

| Number | Country | Date |
|---|---|---|
| 1,920 | Great Britain | June 25, 1872 |

OTHER REFERENCES

"Textbook of Modern Physics" by Weld and Palmer, published by P. Blakiston's Son & Co., Inc., Philadelphia, Pa., Copyright 1930, 2nd Edition, Pages 315 and 713.